Oct. 17, 1939.　　　S. W. BORDEN　　　2,176,755
SWING CURRENT EQUIPMENT
Filed April 2, 1938
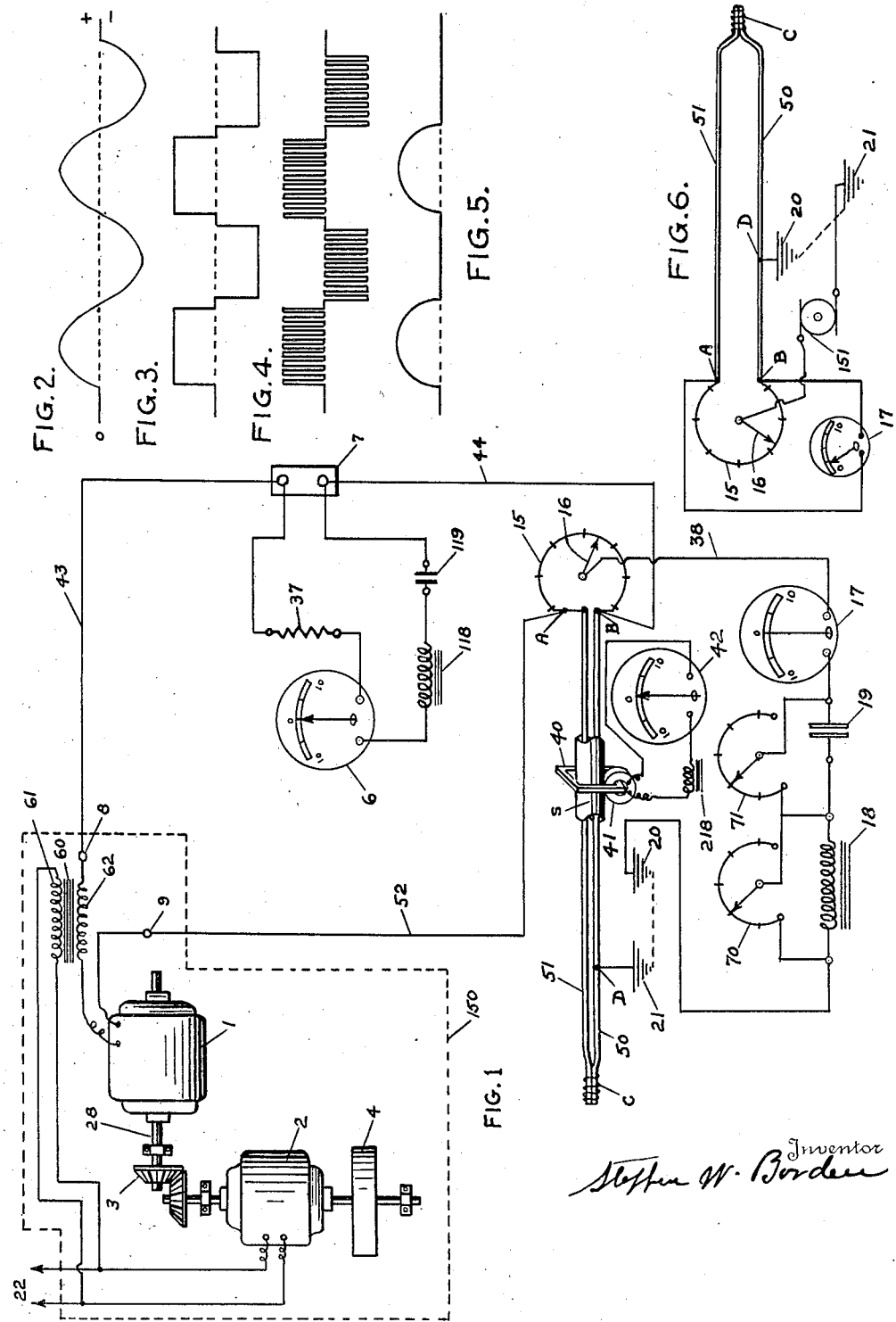

Patented Oct. 17, 1939

2,176,755

UNITED STATES PATENT OFFICE 2,176,755

SWING CURRENT EQUIPMENT

Stephen W. Borden, Summit, N. J.

Application April 2, 1938, Serial No. 199,625

11 Claims. (Cl. 175—183)

REISSUED

APR 29 1941

This invention pertains to devices for use with an electrical current of a special character and for which I have coined the name "swing current".

For use in the specification and claims of this application, the term "swing current" refers to a current flow produced by a potential which varies in a definite manner over a fixed period of time, repetitively, with substantially constant and uniform speed and with a frequency between 1 and 1.5 cycles per second. The wave form of the potential need not conform to any precise pattern, and any of the various patterns illustrated in the drawing, as well as others, will produce the effects desired. A swing current in which the current flows, for a portion of each cycle, above a zero line and, for the balance of the cycle, flows below the zero line, is hereafter referred to as an "alternating swing current" and one in which the current flow, during each complete cycle, is of one polarity only is hereinafter referred to as a "pulsating swing current". Alternating swing currents are illustrated in Figs. 2, 3 and 4, while Fig. 5 illustrates a pulsating swing current. It will be seen that in every case the current flow for at least one-half the cycle is unidirectional and that is an essential feature of "swing current" as herein defined since swing current meters are non-responsive to alternating current.

I have found that the deflections of my swing current meter are substantially in proportion to the average current flow regardless of the wave form of the swing current and it is in this respect differentiated from the conventional vibration type of galvanometer whose deflections closely follow the shape of the wave, meters of this type being sometimes used for waveform analysis. A "swing current generator" is to be understood to be a device for producing current either directly by generation or indirectly by modification of an existing potential.

In the specification and claims, the term "swing current meter" refers to a meter which has a unidirectional field (usually, but not necessarily, of the permanent magnet type) and a movable coil suspended in the field and arranged to deflect a needle over a center zero scale, the direction of deflection reversing with each change of direction of the current in the coil, the coil construction being such as to avoid all damping effects leaving the moving element free to swing as a substantially true pendulum when the coil circuit is open.

In the specification and claims, the term "swing frequency", as applied to a meter, means that frequency of current supply which will produce a greater deflection of the instrument needle, for any given amount of current flowing through the coil, than will a current of any other frequency.

Among the objects of the invention is to provide a testing current and instruments for use therewith which, when applied to an electrical circuit, makes it possible to detect and measure various characteristics of the circuit by observation of the instrument needle, with a relatively high degree of sensitivity and without interference from current of any commercial character which may be flowing in the circuit or in the earth adjacent to the circuit or from any potentials which may be present in the testing circuit by reason of the fact that such circuit may include a portion of the earth's crust or dissimilar metals in contact or potentials from any source whatever other than the swing current itself. Another object is to provide a testing system wherein a single bridge may be effectively used for locating either a ground or an open circuit in low resistance cables.

In the drawing, Fig. 1 is a schematic representation of a swing current generator and swing current meter connected to an electrical circuit for testing purposes. Figs. 2, 3, 4 and 5 illustrate various wave forms of the swing current, any of which are effective but some of which are more effective for certain particular tests than others. Fig. 6 illustrates the present conventional method of connecting up the equipment for making a test similar to that illustrated in Fig. 1 but where direct current is employed in place of swing current, 151 being the direct current source.

In the drawing, Fig. 1. All of the equipment within the dotted enclosure 150 constitutes a swing current generator. The swing current generator 150 consists of a synchronous motor 2 which derives its driving current from a 60-cycle circuit 22. Mounted on the motor shaft is a flywheel 4 to steady the speed and speed reduction means 3 which drives a shaft 28, which in turn drives an alternating current generator 1. 60 is a transformer having a winding 61 connected to the 60-cycle circuit 22 and a secondary winding 62 which is connected in series with generator 1. The speed reduction device 3 is of such ratio as to produce a speed for generator 1 which depends upon the desired frequency of the swing current, for instance, if the generator 1 be operated at a speed to produce current having a frequency of 59 cycles per second while the potential of coil 62 has a frequency of 60 cycles per second, then the frequency of the swing current produced at terminals 8 and 9 will have a frequency of 1 cycle per second, and if the potentials of generator 1 and coil 62 are both sine waves, and of equal value, the potential on terminals 8 and 9 will also be a sine wave whose peak value will equal the sum of the peaks of the generator and coil potentials. It is clear that the generator and transformer 62 will each supply 50% of the power required for the swing current circuit.

It is to be understood that 150 represents any conventional type of swing current generator. It may be of the type shown in U. S. Patent to Bullard, No. 1,538,383, Fig. 4, which would generate swing current of the block type shown in Fig. 3 of this application, or it could be of the type shown in U. S. Patent to Ambronn, No. 1,897,688, Fig. 4.

Connected to terminals 8 and 9 is an electrical circuit including conductor 43, shunt 7, and conductors 44, 50, 51, and 52. Connected to shunt 7 is a swing current meter 6 having in series therewith a calibrating resistance 37, a choke coil 118, and a condenser 119. Conductors 50 and 51 may be two parallel similar conductors connected together at point C and one of which is grounded through fault D. Connected to the open end of conductors 50 and 51 is a resistance 15 having a slidable contact 16 which is connected via lead 38 to the swing current meter 17 and thence through condenser 19 and choke coil 18 to ground at 20. 40 is an iron core encircling conductor 50, which core threads a coil 41 to which is connected a swing current meter 42 via choke coil 218.

Under actual operating conditions the circuit to be tested, even though disconnected from its usual source of energy, may nevertheless be conducting stray alternating current in parts of the circuit or stray direct current, such as street railway current and which may be either machine generated or produced from mercury arc rectifiers or from other generators which produce a ripple harmonic which is detectable, for instance, in a telephone receiver; and these stray currents are sufficient to interfere seriously with any testing equipment which is sensitive to either direct or alternating currents. Furthermore, the entire working circuit may have a substantial potential above that of the earth because of exposure to parallel conductors, such as high tension transmission lines, which are carrying heavy alternating currents, and such a potential would practically preclude the substitution, in place of meter 17, of any detector which is sensitive to currents of commercial frequencies. It is sometimes desired to make tests for determining the location of a fault upon a conductor which is energized and carrying an alternating current load, and here again the equipment must be non-responsive to commercial frequency currents.

On the other hand, there are certain tests which are most conveniently made by utilizing a transformer and it is therefore desirable that the testing current be of a character which will function through a transformer. And since stray direct currents are troublesome, it is very convenient to utilize a condenser for blocking out such currents, but a condenser cannot be so used unless the testing current is of such character that it will flow through a condenser. My swing current, either alternating or pulsating, will function through a transformer and alternating swing current will function through a condenser but pulsating swing current will not, and my swing current meters are of such character that they may be operated in series with a choke coil and condenser which makes them non-responsive to alternating currents of commercial frequencies and to direct current respectively.

By way of illustrating the application of a swing current for testing purposes, we will assume that conductors 50 and 51 are two parallel conductors in an underground lead-covered cable S and that one of the conductors has become grounded at fault D and it is desired to determine the location of fault D. Conductors 50 and 51 are disconnected from the operating system, are connected together at one end, as at C, and are then connected as by conductors 52, 44, and 43 to the terminals 8 and 9 of a swing current generator 150. Across the open ends A and B of conductors 50 and 51 there is connected a slide wire having a calibrated scale and sliding contact 16 which is connected, via conductor 38, to swing current meter 17, thence through condenser 19 and choke coil 18 to ground. When slide 17 has been so adjusted that no current flows through 17, as indicated by the fact that the needle does not swing, the relative lengths of the circuit between B and D and between D and A are known from the position of the slide 16.

The value of the foregoing tests varies with the sensitivity of the meter, as used, and this should be sufficiently high to respond to an adjustment of the slide wire 15 of as little as one part in one thousand and preferably much less, which in turn means that meter 17 must be relatively sensitive, because the total voltage between terminals A and B may be relatively small, possibly of the order of only a volt or so, because conductors 50 and 51 are connected directly across these points. However, in practice the voltage between A and B is made as large as permissible, the upper limit being determined by the amount of current which may safely be circulated through conductors 50 and 51 and through the slide wire 15. Ordinarily, I design the slide wire 15 so that a potential of 100 volts may be applied between A and B and, for use in making tests on relatively large size conductors, I provide a swing current generator having a capacity of at least 100 amperes.

Meter 17, in addition to being a sensitive type of meter, must be non-responsive to commercial frequency currents, and therefore any alternating current type of meter or other indicating device, such as a telephone receiver, cannot be used satisfactorily. Furthermore, meter 17 must be non-responsive to direct current, because the circuit through the earth from point 20 to 21 frequently, in fact almost invariably, produces a direct current potential between the points 20 and 21, due to polarization of the earth electrodes, and a potential is also liable to be created at the point of contact between slider 16 and resistance 15 due to the contact of dissimilar metals and additional potential may be present due to stray current flowing in the earth; and even these relatively small potentials may be sufficient to cause full scale deflection on a high sensitivity direct current meter, which precludes the use of direct current for testing with the apparatus connected as indicated in Fig. 1.

As a matter of fact, tests as conducted today are generally made with direct current, but the source of current and the meter 17 are transposed, as shown in Fig. 6, in which 151 is the source of direct current, so that meter 17 is no longer connected in the earth circuit and therefore not exposed to the foreign potentials above mentioned. It is obvious that this method is of relatively low sensitivity, because even with a relatively high direct current voltage it is not possible to secure more than a few amperes of current through the fault D and the ground circuit 21—20 even when the fault and ground circuit have relatively small values, and usually the fault D has a relatively high resistance value.

With the test current source and the null indicator connected as shown in Fig. 1, the sensitivity of meter 17 is affected only slightly by relatively high fault resistance values and it is therefore unnecessary to employ the practice of "burning down" the fault to a low value, which is common practice with conventional testing methods and which is undesirable because of the additional damage frequently done to the faulty cable and other adjacent cables and which procedure is furthermore not always possible due to the lack of the necessary high voltage and high capacity current source necessary for such "burning down" and the skilled personnel competent to handle such high voltage work.

Swing current meters 6, 17, and 42 may be identical meters and are preferably of the portable type and of relatively rugged construction and of as high sensitivity as feasible considering the foregoing limitations. I prefer to use a more or less conventional portable direct current galvanometer of the permanent magnet, moving coil type and having a sensitivity of about two microamperes per millimeter division and a coil circuit resistance of about 125 ohms and provided with a zero reading scale with about 30 divisions each side of the zero. I prefer a moving system having a free period in the neighborhood of .83 second which coresponds to a frequency of 1.2 cycles per second. In order to obtain such a free period, the coil should preferably have no bobbin so that there is substantially no damping present when the coil circuit is open, and of course the other physical characteristics of the moving element must be such that the element swings as a free pendulum at the desired frequency.

For use with a meter having the foregoing characteristics and for the purpose of preventing direct current or alternating current interference and, at the same time, retaining satisfactory sensitivity in the meter circuit, I employ a condenser 19 having a capacity of about 16 microfarads and a breakdown voltage of not less than 1,000 volts and a choke coil 18 of approximately 1100 henrys and 6000 ohms DC resistance each of which may be shunted by a variable resistor, as 70 and 71, of about 1 megohm with an open position at the end. With this equipment, a 600 volt direct current source may be placed in series with meter 17 and also a 60-cycle source of anything up to 600 volts may also be placed in the series and when 70 and 71 are open, there will be no appreciable effect upon the operation of the meter or the accuracy of the test, which features become extremely important when making tests on live circuits. Of course, the choke coil 18 will pass some 60-cycle current, but it will not pass enough, on 600 volts, to cause any serious vibration of the meter needle nor enough to in any way endanger the meter winding.

With five volts between terminals A and B, the sensitivity is such that meter 17 will give a deflection of ¼ division for a change of one part in ten thousand on the slide wire 15 when the resistance of the earth circuit, including fault D and the meter, but not the choke or condenser, is of the order of 1000 ohms. It is of course understood that slide wire 15 is merely schematic and that a rather elaborate type of slide wire or other resistance device is necessary in order to be able to adjust the resistance values in steps of .01 of 1%. If proper personnel is available for its operation, a much more sensitive swing current meter may be used.

If it were possible to use direct current with the connections as shown in Fig. 1 and with choke 18 and condenser 19 short-circuited, and with 1 ampere flowing in the conductors 50 and 51, the sensitivity, for any given ground circuit resistance, would be substantially the same as that obtained with the connections made as shown in Fig. 6 providing that in the case of Fig. 6 a current of 1 ampere is forced through the ground circuit, but if the current is less the sensitivity will be decreased proportionately. Now, in actual practice, in order to obtain 1 ampere through the fault and ground circuit, it is necessary to resort to the "burning down" process which has the objectionable features previously mentioned, and even when this practice is resorted to, it still is necessary to provide a direct current source of testing current of not less than 500 volts and preferably as much as 5 kilowatts capacity. In actual practice, the ground current which is permissible and obtainable is usually of the order of a fraction of an ampere, and the sensitivity is correspondingly low.

For instance, in the case of Fig. 1, if the resistance of conductors 50 and 51 in series is, say one ohm, then 1 volt applied between A and B will produce a flow of one ampere in the conductors. Now, if the resistance of the fault and ground circuit in series is 1000 ohms then, with the connections of Fig. 6, it will require 1000 volts to force 1 ampere through the circuit and since for equal sensitivities, other things being equal, we need equal current flows, we can obtain the same sensitivity, with the connections of Fig. 1 when using only one volt and 1 ampere as we can obtain by using Fig. 6 connections with 1000 volts and 1 ampere or 1 kilowatt. In the latter case the sensitivity can be increased only by increasing the voltage which has its objectionable features and definite limitations and the kilowatts dissipated in the fault increase with the voltage and more than 1 kilowatt is liable to cause serious damage, less than that being required for most burning down jobs, so that the difficulties of improving sensitivity by increasing the voltage multiply rapidly. On the other hand, with the connections of Fig. 1, the voltage which may be applied between A and B is limited only by the resulting current flow in conductors 50 and 51. If these will safely carry say 100 amperes for a short period then we can apply 100 volts across A and B, thereby increasing the sensitivity 100 fold. To get the same increases with Fig. 6 connections we would have to apply 100,000 volts and 100 kilowatts, and such extreme voltages are now actually being used in some cases—see Electrical World of August 27, 1938, pp. 40–41 and 89.

The amount of direct current necessary to produce a deflection of one division on meter 17 will produce a deflection of 15 divisions when swing current is employed providing the resistance of the external circuit is not low enough to cause damping, but this gain in sensitivity is somewhat offset by the addition of the choke coil and condenser in series with the meter, when these devices are used for protection against foreign currents. Of course, where the conditions are such that it is not necessary to employ either the choke or the condenser, the full benefit of the increased sensitivity is realized; and under those conditions where it is practical to use straight direct current, it is just as feasible to use swing current without the choke or condenser in series with the meter. And the shunt resistances 70 and 71 may be reduced to such values as the existing conditions will permit and the sensitivity increased accordingly.

When the choke and condenser are utilized, as in Fig. 1, the relative sensitivity of the over-all circuit, as compared to the use of direct current with the same circuit arrangement but with the choke and condenser omitted, depends upon the amount of resistance in the fault and ground circuit. From the following Table I, it will be seen that when the total resistance of the meter, fault, and ground circuit is approximately 1000 ohms, the sensitivities are equal, and as the resistance increases the sensitivity of the swing meter becomes relatively greater up to about 100,000 ohms when it is substantially 15 times greater and remains so for all higher resistance values. On the other hand, if the fault and ground resistance be as low as 200 ohms, the direct current system would be 2.5 times as sensitive as the swing current. It must be borne in mind that the resistance of most faults, unless "burned down," is relatively high and often very high, and in any case it is under the conditions of relatively high fault resistance that increased sensitivity is required in the testing equipment.

Table I

| Resistance of fault, ground circuit and meter in ohms* | Millivolts, DC and SC | Microamperes | | Deflection | | Sensitivity parts in 10,000** | | Relative sensitivity of SC, DC and SC |
|---|---|---|---|---|---|---|---|---|
| | | DC | SC | DC | SC | DC | SC | |
| 325 | 19.5 | 60 | 1.5 | 30 | 12 | 1.3 | 3.25 | .4 |
| 425 | 25.5 | 60 | 2.0 | 30 | 15 | 1.7 | 3.40 | .5 |
| 625 | 37.5 | 60 | 2.7 | 30 | 20 | 2.5 | 3.75 | .7 |
| 825 | 49.5 | 60 | 3.3 | 30 | 25 | 3.3 | 3.80 | .9 |
| 975 | 58.5 | 60 | 4.0 | 30 | 30 | 3.9 | 3.90 | 1.0 |
| 1,125 | 61.9 | 55 | 4.0 | 27.5 | 30 | 4.5 | 4.12 | 1.1 |
| 1,625 | 65 | 40 | 4.0 | 20.0 | 30 | 6.5 | 4.33 | 1.5 |
| 2,125 | 68 | 32 | 4.0 | 16.0 | 30 | 8.5 | 4.53 | 1.9 |
| 5,125 | 77 | 15 | 4.0 | 7.5 | 30 | 20.5 | 5.13 | 4.0 |
| 10,000 | 100 | 10 | 4.0 | 5.0 | 30 | 40.0 | 6.67 | 6.0 |
| 20,000 | 120 | 6 | 4.0 | 3.0 | 30 | 80.0 | 8.00 | 10.0 |
| 100,000 | 400 | 4 | 4.0 | 2.0 | 30 | 400.0 | 26.67 | 15.0 |

*Swing current readings taken with a 1080 henry, 6,000 DC ohm choke and a 10 microfarad condenser in series with the meter. The effective resistance of these two devices, on 1.2 cycle current, is about 9000 ohms. The DC readings taken with choke and condenser short circuited.

**Change in slide wire adjustment necessary to produce a deflection of one division on the galvanometer with 5 volts across the slide wire. The balanced condition can be detected more closely than ¼ of a division.

It has been noted that the sensitivity depends upon the voltage between terminals A and B, but the maximum voltage is limited by the current flow which conductors 50 and 51 in series can safely carry. The following Table II indicates the minimum length of the conductor, as AC in Fig. 1, which for various sizes of conductor will permit maintaining 5 volts across the terminals AB.

Table II

| Conductor size | Carrying capacity | Ohms per 1,000 ft. | Minimum length |
|---|---|---|---|
| | | | Feet |
| 4 | 100 | .25 | 100 |
| 0 | 200 | .10 | 200 |
| 500 M. C. M | 600 | .02 | 1,250 |

If the generator capacity is limited to 100 amperes, then, in the case of the 500 M. C. M. conductor, only ⅖ of a volt could be used across the slide wire and the sensitivity, for ¼ division and 1000 ohms, would be reduced to about 6 parts in 10,000 but that means only 1½ ft. one way or the other in locating the fault on the 1250 foot 500 C. M. C. cable. For greater sensitivity, a larger generator or a more sensitive galvanometer could be used.

With the connections of Fig. 1 it is permissible to have slide wire 15 of relatively high resistance, say 1000 ohms, since the total resistance in the galvanometer circuit, for high resistance grounds, is so great that the sensitivity will be very little affected by this side wire resistance. Such a slide wire resistance is as high as desirable for making tests for locating open circuits in conductors, while a low resistance wire, say 10 ohms or less, is not suitable. In the case of Fig. 6 it is essential that a very low resistance slide wire be used for locating grounds in low resistance cables, since the total testing current must flow through it and when this method is used a separate high resistance slide wire bridge must be used for open circuit testing.

After the position of fault D has been ascertained by the foregoing method, it may be thought advisable to endeavor to check the location by means of a tracer current, and swing current is very appropriate for that purpose. The iron core 40, which is designed for the purpose, encircles conductors 50 and 51 and their protective sheath, and since the tracer current is flowing in conductor 50 at the location shown, the tracer current will be reflected on meter 42 through core 40 and winding 41, and this continues to be true as core 40 is moved along the cable until it passes point D where there will no longer be fault current in conductor 50 and the indication will disappear from meter 42.

In my co-pending applications, Serial Nos. 199,627 and 199,628, I have described in detail a device of the character of 40 for picking up tracer currents and also a device for detecting tracer current in the lead cable sheath, and a study of these will indicate that very sensitive devices of this sort may be constructed, and meter 42 is not subjected to direct current, and commercial frequency alternating current is choked out by the choke coil 218.

The swing current generator here illustrated will produce an alternating current of substantially sine wave contour as shown in Fig. 2. However, if the generator produces an alternating current having a contour as in Fig. 3, which contour results from inverting a storage battery current by means of a rotating polarity changer operating at the desired speed, or a contour such as shown in Fig. 4, which results from inverting a half wave rectified 60-cycle current by means of a polarity changer, and in fact substantially any alternating swing current, regardless of wave form, will give fairly good results even though a blocking condenser, as 19, is used in the circuit. Where no blocking condenser is involved, or where the meter is operated from a transformer, unidirectional impulses such as shown in Fig. 5 may be employed and may be produced with less expensive equipment such as a plain interrupter.

While I have described certain features more or less in detail, it will be understood that the invention will employ various devices of differing forms and construction and it is to be understood that the invention is not to be limited except by the scope of the appended claims taken in conjunction with the state of the prior art.

What I claim is:

1. Apparatus for determining properties of an electrical circuit which includes a source of alternating current having a frequency of the order of 1.2 cycles per second, for connection to the circuit; and a swing current meter having a frequency of substantially 1.2 cycles per second for connection to the circuit via a transformer; and a choke coil connected in series with the meter.

2. Apparatus for determining properties of an electrical circuit which includes a source of alternating current having a frequency of the order of 1.2 cycles per second, for connection to the circuit; and a swing current meter having a frequency of substantially 1.2 cycles per second for connection to the circuit; and a choke coil and a condenser connected in series with the meter.

3. Apparatus for determining properties of an electrical circuit which includes a source of testing current for connection to the circuit the potential of which varies with a constant and relatively low frequency and a direct current galvanometer connected to the circuit via a 1100 henry choke coil and a 16 microfarad condenser the galvanometer having a sensitivity of substantially 2 microamperes per division and a coil circuit resistance of substantially 125 ohms and a swing frequency which is substantially that of the test current.

4. A swing current meter for determining properties of an electrical circuit in which a swing current is flowing, which consists of a direct current galvanometer whose moving element is designed to swing as a substantially true pendulum and with a free period substantially equal to the reciprocal of the frequency, in seconds, of the swing current in combination with a condenser in series with the winding of the moving element.

5. The combination of a direct current galvanometer having a free period of approximately .83 second and a sensitivity of approximately two microamperes per millimeter division, with a condenser and a choke coil connected in series with the winding of the moving element of the galvanometer.

6. Means for restricting passage of 60-cycle current and direct current through the moving coil of a meter without seriously restricting the passage of swing current therethrough, which includes a condenser and an inductance coil of substantially 1100 henries connected in series with the moving coil, the condenser and inductance coil constituting a substantially resonant circuit for the swing current frequency.

7. The method of locating a fault in a conductor which includes connecting the faulty conductor to one end of a slide wire, connecting a good conductor to the other end of the slide wire, connecting the remaining ends of the conductors together, connecting the sliding contact of the slide wire to ground through a swing current meter, a choke coil and a condenser in series, connecting the ends of the slide wire to a source of swing current and then adjusting the position of the sliding contact on the slide wire until no current flows through the meter.

8. Apparatus for determining properties of an electric circuit which includes a source of current for connection to the circuit the potential of which varies with a constant and relatively low frequency of the order of approximately 1.2 cycles per second and a swing current meter for connection to the circuit the meter having a unidirectional field and a movable coil in the field, the coil mounting being of the conventional jewel and pivot type, a pointer attached to the coil and a zero center scale over which the pointer moves for indicating thereon, the free period of the moving element of the meter and the frequency of the source of current being so coordinated that for any given current flowing in the coil the deflection of the meter element to either side of zero will be greater for that frequency than for any other frequency.

9. The combination of a swing current generator designed to produce swing current having a block shaped waveform and a swing current meter, having the same swing frequency as the generator, both connected to an electrical circuit for determining swing current potentials existing between different points of the circuit.

10. Equipment for locating a fault to ground in a defective conductor which includes; a source of swing curent, an adjustable resistance for connection across the source of swing current and for connection at one end to the faulty conductor and for connection at the other end to a nonfaulty conductor the remaining end of which is to be connected to the remaining end of the faulty conductor, a sliding contact for the adjustable resistance and a swing current meter for connection between the sliding contact and ground.

11. Equipment according to claim 10 characterised by the addition of a choke coil and a condenser in series with the swing current meter.

STEPHEN W. BORDEN.